F. M. HOLMES.
STORAGE BATTERY PLATE.
APPLICATION FILED NOV. 4, 1908.
953,269.
Patented Mar. 29, 1910.
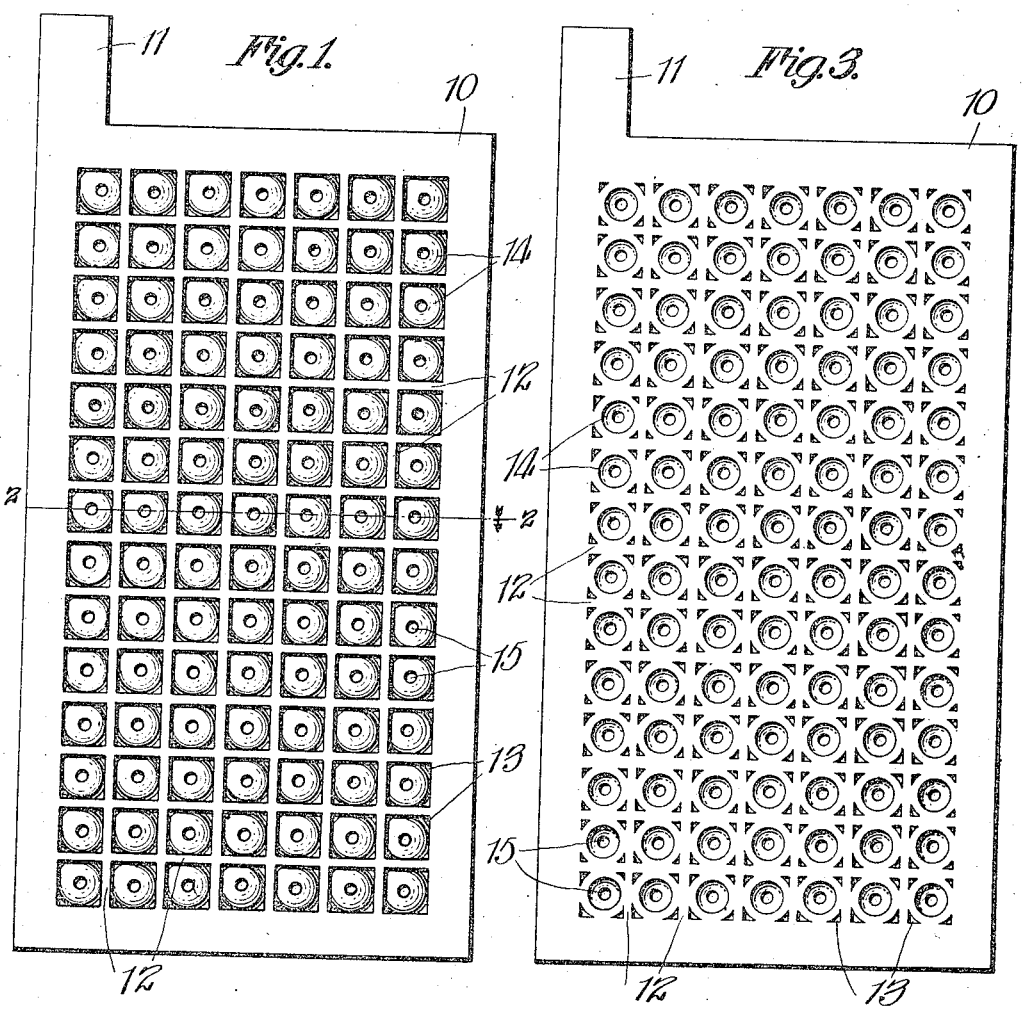
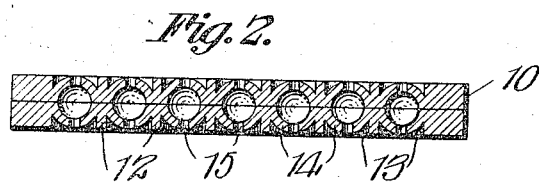
Witnesses
Chas. C. Richardson.
J. W. Gillis
Inventor
Frank M. Holmes,
By Chandler & Chandler
Attorneys.

UNITED STATES PATENT OFFICE.

FRANK M. HOLMES, OF MARIONVILLE, MISSOURI, ASSIGNOR, BY DIRECT AND MESNE ASSIGNMENTS, OF PART INTERESTS TO A. L. LEDBETTER, OF MARIONVILLE, MISSOURI, AND A. V. BOSWELL AND L. D. SNAPP, OF JASPER COUNTY, MISSOURI.

STORAGE-BATTERY PLATE.

953,269.

Specification of Letters Patent. Patented Mar. 29, 1910.

Application filed November 4, 1908. Serial No. 460,999.

*To all whom it may concern:*

Be it known that I, FRANK M. HOLMES, a citizen of the United States, residing at Marionville, in the county of Lawrence, State of Missouri, have invented certain new and useful Improvements in Storage-Battery Plates; and I do hereby declare the following to be a full, clear, and exact description of the invention, such as will enable others skilled in the art to which it appertains to make and use the same.

This invention relates to storage batteries and has special reference to a plate or electrode therefor.

The principal object of the invention is to increase the available area of such a plate.

Another object of the invention is to provide an improved form of plate arranged to hold the active material or paste in an improved manner.

The invention further consists in certain novel details of construction and combinations of parts hereinafter fully described, illustrated in the accompanying drawings, and specifically set forth in the claims.

In the accompanying drawings, like characters of reference indicate like parts in the several views, and:—Figure 1 is a side elevation of the exterior of a plate constructed in accordance with this invention. Fig. 2 is a horizontal section on the line 2—2 of Fig. 1. Fig. 3 is a view of one of the half plates before assembling.

The numeral 10 indicates the frame of the plate and this is preferably made of a sufficient strength to support the interior thereof in a rigid manner. This frame is further provided with a terminal 11 of any desired form. Between the sides and top members of the frame 10 the plate is formed with a number of bars 12 which intersect to form reticulations 13. The plates thus formed are preferably half the thickness of the complete plate. In each of these reticulations 13 and integrally formed with the bars 12 is a hollow hemisphere 14 provided with a perforation 15 centrally located with reference to the reticulations. The concaved surface of this hemisphere is arranged so that it lies on the outside of the plate when two of the half plates thus formed are joined by burning or clamping. The plate formed by clamping two of these members together is then filed with active material, the material being placed within the spheres before the two halves are joined or is introduced through one of the perforations 15 after such joining of the halves. It is to be noted that the plate thus formed gives a very large area of active surface in comparison to the superficial extent of the plate since both the inside and the outside of the spheres are used as well as the grid formed by the bars 12. It will be noted that pockets for additional active material are provided between the corners of the reticulations and the sphere.

Having thus described the invention, what is claimed as new, is:—

1. A storage battery plate comprising an integral body having a plurality of individual receptacles for the active material, and a plurality of intersecting reinforcing bars united with the receptacles and lying between the same, each receptacle being surrounded by sections of the intersecting bars.

2. A storage battery plate comprising a plurality of hollow perforated receptacles for active material, and a plurality of intersecting reinforcing bars between which and with which the receptacles are connected, each of said receptacles being spherical in shape and having such arrangement with respect to the bars as to produce pockets for active material between portions of their surfaces.

In testimony whereof, I affix my signature, in presence of two witnesses.

FRANK M. HOLMES.

Witnesses:
WYATT CANNADY,
A. A. LINDSEY.